Patented Oct. 19, 1943

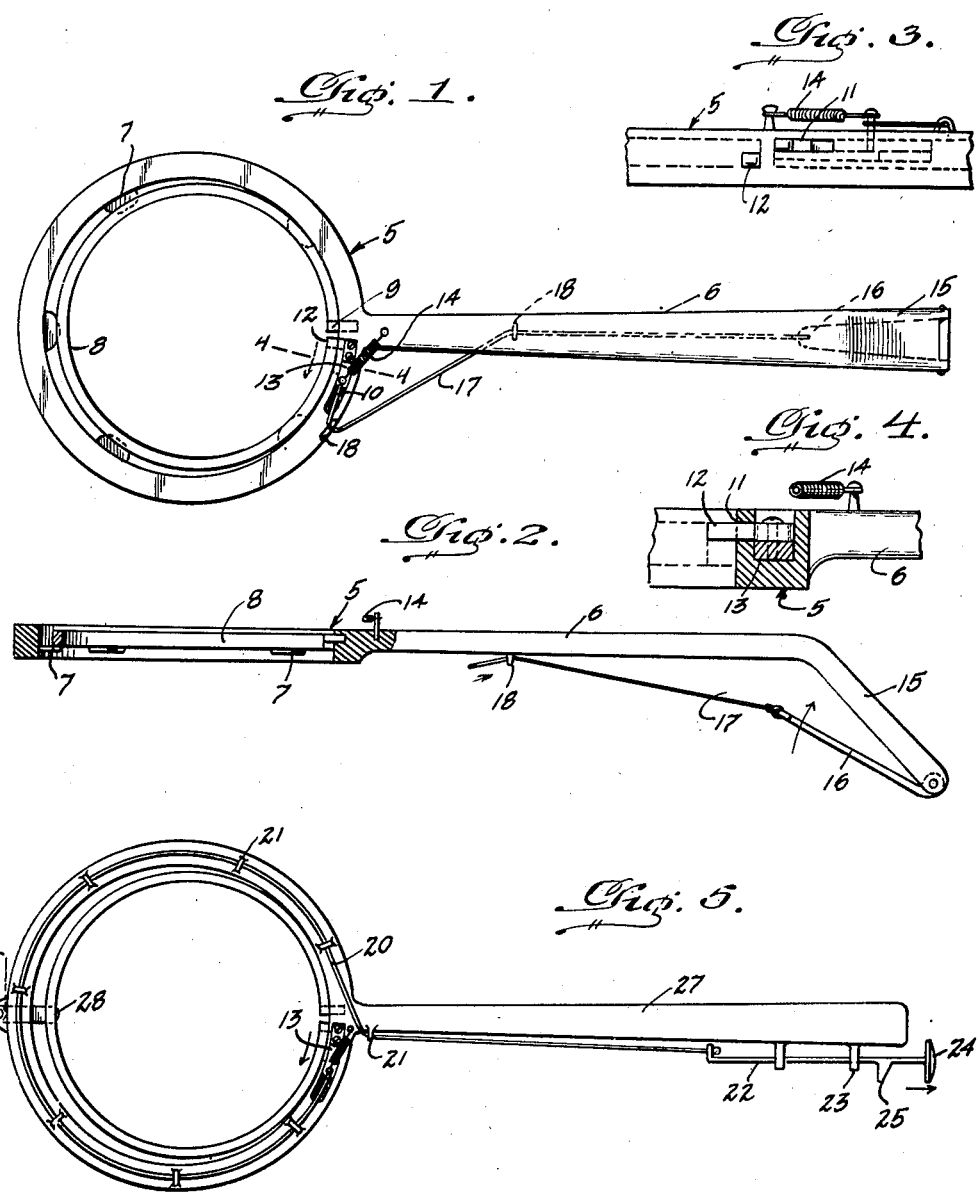

2,332,046

UNITED STATES PATENT OFFICE 2,332,046

PISTON RING INSTALLING AND REMOVING TOOL

Clay Bird, New London, Conn.

Application March 20, 1943, Serial No. 479,936

4 Claims. (Cl. 29—86.4)

This invention relates to a piston ring tool, and has for the primary object the provision of a device of this character which will greatly facilitate the application and removal of a piston ring from a piston and will eliminate the possibility of breaking the ring by over and irregular expansion thereof and will reduce to a minimum the possibility of injury to the person carrying out the work.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view illustrating a piston ring tool constructed in accordance with my invention.

Figure 2 is a side elevation partly in section illustrating the tool.

Figure 3 is a fragmentary view showing the ring expanding lug for the tool.

Figure 4 is a detail sectional view taken on the line 4—4 of Figure 1.

Figure 5 is a top plan view illustrating a modified form of my invention.

Referring in detail to the drawing, the numeral 5 indicates an annular body or frame on which is formed a handle 6. A plurality of lips 7 are formed on one edge of the frame or body and project inwardly thereof for the purpose of supporting within the body or frame a piston ring 8 while in a contracted position.

The internal diameter of the frame or body and the distance between the inner ends of the lips is such that the body or frame may be moved freely over a piston to which the piston ring belongs. A lug 9 is fixed in the body or frame adjacent the handle 6 and extends a limited distance beyond the inner periphery of the body or frame and is non-movable relative to the latter. The body or frame adjacent the handle is provided with a groove 10 and a slot 11 communicating with said groove and opening through the inner periphery of the body or frame to slidably receive a movable lug 12 formed on a block 13 slidable in the groove 10. The lug 9 is adapted to engage one end of the piston ring while the lug 12 engages the other end of said piston ring.

A coil spring 14 is connected to the handle and to the block for urging the lug 12 toward the lug 9. The slot 11 controls the distance in which the lug 12 may slide relative to the lug 9.

The handle 6 is provided with an offset portion 15 forming a hand grip to which is pivoted a finger piece 16 and connected to the latter is a flexible element 17 which passes through eyes 18 mounted on the handle and on the frame or body. The flexible element is connected to the block 13 so that on movement of the finger piece 16 toward the grip 15, the block 13 will be caused to slide against the action of the spring 14 and move the lug 12 away from the lug 9 bringing about expansion of the piston ring within the body or frame and as the latter is supported by the lips within the frame or body no danger of the ring slipping out of the body will occur during the expansion thereof. Further, it will be noted that as the ring expands it comes in contact substantially with the full circumference of the inner periphery of the frame or body preventing the ring from being over-expanded and thereby eliminate the danger of breaking the ring. As soon as the finger grip is released, the spring 14 acts to return the lug 12 toward the lug 9 relieving the piston ring of force tending to expand the same. When the ring is expanded within the body or frame it may be readily moved over a piston to bring the ring in position within the ring groove of the piston and allowed to become seated in the groove by releasing the force of expansion on the ring by freeing the finger piece 16. To remove the ring from the groove of the piston, the frame or body is brought down over the piston until the lugs 9 and 12 enter between the ends of the piston ring and the finger piece 16 is then moved toward the hand grip 15 expanding the ring fully into the body or frame whence it may be lifted free of the piston.

From the foregoing description taken in connection with the accompanying drawing, it will be seen that a very efficient tool has been provided for the application and removal of a piston ring from a piston and permits the operation to be substantially carried out by a person through the use of one hand.

Referring to my modified form of the invention shown in Figure 5, the tool is provided with a different type of operating means for the sliding block 13. In this form of the invention the block 13 has a flexible element 20 connected thereto which passes through eyes 21 arranged on the body or frame and also through an eye 21 on the handle and is connected to an operating rod 22 slidably and rotatably mounted on the handle, as shown at 23. The operating rod is provided with a finger piece 24 and with a catch lug 25. A pull on the finger piece 24 will expand the ring in the body and to hold the ring in an expanded position, the operating rod is rotated to bring the lug into engagement with the end of the handle. In this form of the invention the handle is indicated by the character 27 and is substantially straight.

Pivoted on the body opposite the handle 27 is a lug 28 to coact with the lugs 12 and 9 in supporting the ring in the body prior to the expansion of the ring. After the ring has been expanded the lug 28 may be moved into dotted line position so as not to interfere with the movement of the body or frame on and off of the piston.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a piston ring tool, an annular body to receive a piston ring therein, a fixed lug on the body and engaging one end of the piston ring, a lug slidable on said body to engage the other end of the ring, said body having a slot to receive the slidable lug for limiting the movement thereof, said body having a groove, a block slidable in the groove and connected to the slidable lug, a handle on the body, and an operating means connected to the block and to the handle.

2. In a piston ring tool, an annular body to receive a piston ring therein, a fixed lug on the body and engaging one end of the piston ring, a lug slidable on said body to engage the other end of the ring, said body having a slot to receive the slidable lug for limiting the movement thereof, said body having a groove, a block slidable in the groove and connected to the slidable lug, a handle on the body, a tension spring connected with the block to urge the movable lug toward the fixed lug, a flexible element connected to the block, guide eyes on the handle and body and receiving the flexible element, and an operating member pivoted on the handle and connected to the flexible element.

3. In a piston ring tool, an annular body, a handle on said body, fixed and movable lugs carried by said body to engage the ends of a piston ring arranged in the body, a block slidable in the body and connected to the movable lug, guide eyes arranged on the body and handle, a flexible element trained through said eyes and connected to the block, tension means connected to the block, an operating rod slidably and rotatably connected to the handle and to the flexible element and including a lug movable into engagement with the end of the handle for sustaining the ring expanded against the body.

4. In a piston ring tool, an annular body, a handle on said body, fixed and movable lugs carried by said body to engage the ends of a piston ring arranged in the body, a block slidable in the body and connected to the movable lug, guide eyes arranged on the body and handle, a flexible element trained through said eyes and connected to the block, tension means connected to the block, an operating rod slidably and rotatably connected to the handle and to the flexible element and including a lug movable into engagement with the end of the handle for sustaining the ring expanded against the body, and a member pivoted on the body and movable to assist in supporting the ring in the body while contracted and movable to occupy a position to permit the ring to move freely from the body.

CLAY BIRD.